United States Patent
Feng et al.

(10) Patent No.: US 12,500,666 B2
(45) Date of Patent: Dec. 16, 2025

(54) LINK STATUS MEASUREMENT METHOD, APPARATUS, AND SYSTEM, AND STORAGE MEDIUM

(71) Applicant: Huawei Technologies Co., Ltd., Shenzhen (CN)

(72) Inventors: Yi Feng, Dongguan (CN); Ling Li, Athens (GR); Gang Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 18/490,966

(22) Filed: Oct. 20, 2023

(65) Prior Publication Data
US 2024/0048237 A1 Feb. 8, 2024

Related U.S. Application Data

(63) Continuation of application No. PCT/CN2022/079342, filed on Mar. 4, 2022.

(30) Foreign Application Priority Data

Apr. 23, 2021 (CN) .......................... 202110444046.2

(51) Int. Cl.
*H04B 10/079* (2013.01)
(52) U.S. Cl.
CPC ................. *H04B 10/0795* (2013.01)
(58) Field of Classification Search
None
See application file for complete search history.

(56) References Cited

U.S. PATENT DOCUMENTS

| 9,203,509 | B2 * | 12/2015 | Wang | H04B 10/07955 |
| 2012/0020662 | A1 * | 1/2012 | Ding | H04J 3/1694 398/38 |

FOREIGN PATENT DOCUMENTS

CN 111970049 A 11/2020

OTHER PUBLICATIONS

ITU-T-G.984.1, Series G: Transmission Systems and Media, Digital Systems and Networks Digital sections and digital line system—Optical line systems for local and access networks, Gigabit-capable passive optical networks (GPON): General characteristics, Mar. 2008, total 43 pages.

China Telecom, China Telecom EPON Equipment TechnicalRequirements V2.1, China Telecom Corporation, Apr. 2009, total 165 pages.

* cited by examiner

*Primary Examiner* — David W Lambert
(74) *Attorney, Agent, or Firm* — Slater Matsil, LLP

(57) ABSTRACT

A link status measurement method includes: A first OLT sends first indication information to a first ONU through a first port. The first ONU is one of at least one ONU included in a PON, and the first indication information indicates a measurement window for measuring the first ONU. The first OLT obtains quality of a signal corresponding to the first ONU. The quality of the signal is quality of a signal received by a second port on a second OLT from a first PON channel in a measurement window, and the first PON channel is a channel carried on a link between the second port and the first ONU. The first OLT determines a status of a backbone link based on quality of a signal corresponding to each ONU in the PON. The backbone link is a common part of a link from the second port to each ONU.

18 Claims, 5 Drawing Sheets

LINK STATUS MEASUREMENT METHOD, APPARATUS, AND SYSTEM, AND STORAGE MEDIUM

CROSS-REFERENCE TO RELATED APPLICATIONS

This application is a continuation of International Application No. PCT/CN2022/079342, filed on Mar. 4, 2022, which claims priority to Chinese Patent Application No. 202110444046.2, filed on Apr. 23, 2021. The disclosures of the aforementioned applications are hereby incorporated by reference in their entireties.

TECHNICAL FIELD

This application relates to the communication field, and in particular, to a link status measurement method, apparatus, and system, and a storage medium.

BACKGROUND

A passive optical network (PON) includes an optical line terminal (OLT), an optical splitter, and a plurality of optical network units (ONUs), and the OLT includes an active port and a standby port. The active port communicates with the optical splitter through a first backbone link, the standby port communicates with the optical splitter through a second backbone link, and the optical splitter further communicates with each ONU.

The OLT communicates with the ONU on an active link through the active port. When the active link is faulty, the OLT communicates with the ONU on a standby link through the standby port. If the standby link cannot meet an optical power requirement, some ONUs may fail to go online after the active link is switched to the standby link. Therefore, a detection method is urgently needed to detect a status of a standby link, to ensure normal running of a service after link switching.

SUMMARY

This application provides a link status measurement method, apparatus, and system, and a storage medium, to ensure that a service can be run normally after link switching. Technical solutions are as follows.

According to a first aspect, this application provides a link status measurement method. In the method, a passive optical network PON includes a first optical line terminal OLT. The first OLT includes a first port, and a first PON channel and a second PON channel are carried on a link between a second port and a first optical network unit ONU. The first ONU is one of at least one ONU included in the PON, the first PON channel is used to transmit a measurement signal, the second PON channel is used to transmit a service signal, and an optical wavelength corresponding to the measurement signal is different from an optical wavelength corresponding to the service signal. The first OLT sends first indication information to the first ONU through the first port. The first indication information indicates a measurement window for measuring the first ONU. The first ONU sends the measurement signal on the first PON channel in the measurement window, and the first OLT obtains quality of a signal received by the second port in the measurement window, to obtain quality of a signal corresponding to the first ONU. The signal received by the second port includes the measurement signal sent by the first ONU. The first OLT determines a status of a backbone link based on quality of a signal corresponding to each ONU in the PON. The backbone link is a common part of a link from the second port to each ONU.

Because the first OLT sends the first indication information to the first ONU through the first port, and the first indication information indicates the measurement window for measuring the first ONU, the first ONU sends the measurement signal on the first PON channel in the measurement window. In this way, a second OLT measures the quality of the signal received by the second port in the measurement window, to obtain the quality of the signal corresponding to the first ONU. By repeating the foregoing process, the quality of the signal corresponding to each ONU in the PON may be obtained. In this way, the status of the backbone link can be accurately determined based on the quality of the signal corresponding to each ONU. A service is switched to the backbone link only when the status of the backbone link is a normal state, so that the service can be normally transmitted on the backbone link. Therefore, the link status detection method ensures that the service can be run normally after link switching.

In addition, the status of the backbone link is determined based on the quality of the signal corresponding to each ONU. Therefore, precision of measuring the status of the backbone link is improved. In addition, a measurement window is provided for the first ONU, and the quality of the signal corresponding to the first ONU is measured in the measurement window. In this way, the quality of the signal corresponding to the first ONU can be measured in a short time, and a time length of the measurement window may be set to be short. Therefore, although a measurement window is separately provided for each ONU to separately obtain the quality of the signal corresponding to each ONU in a measurement window corresponding to each ONU, a total time length of the measurement window corresponding to each ONU is also short. This improves efficiency of measuring the status of the backbone link. The first PON channel and the second PON channel are carried on the link between the second port and the first ONU. The first PON channel is used to transmit the measurement signal, the second PON channel is used to transmit the service signal, and a dual-channel is used to transmit the measurement signal and the service signal. This ensures that service transmission between an OLT and each ONU in the PON is not affected when a link status is measured.

In a possible implementation, the first indication information includes at least one of start time of the measurement window and a time length of the measurement window. In this way, it is convenient for the first ONU to quickly determine the measurement window.

In another possible implementation, the first port is a port on the first OLT, the second port is a port on the second OLT, the first OLT and the second OLT are two different OLT devices, and the first OLT sends the first indication information to the second OLT. The first indication information further indicates the second OLT to obtain quality of a signal received by the second port from the first PON channel in the measurement window. This ensures that the second OLT can determine the measurement window, and measure the quality of the signal corresponding to the first ONU in the measurement window, to ensure that the status of the backbone link can be successfully measured in dual-homing protection networking.

In another possible implementation, the first OLT receives measurement information sent by the second OLT. The measurement information includes the quality of the signal corresponding to the first ONU. This facilitates the first OLT to obtain the quality of the signal corresponding to each ONU, to measure the status of the backbone link based on the quality of the signal corresponding to each ONU.

In another possible implementation, the first port and the second port are two different ports on the first OLT.

In another possible implementation, the measurement window includes at least one sending periodicity, and each sending periodicity includes a first time period and a send window corresponding to each ONU. A send window corresponding to the first ONU is a window for the first ONU to send an operation and maintenance service to the first OLT, and the first indication information indicates the first ONU to send the measurement signal in the first time period. In this way, each ONU may separately send the operation and maintenance service in the send window corresponding to each ONU, to avoid impact on the operation and maintenance service.

In another possible implementation, the quality of the signal corresponding to the first ONU includes at least one received signal strength indication RSSI, and the at least one RSSI is an RSSI of the signal received by the second port in the measurement window. Because an RSSI signal is easy to be measured, the status of the backbone link can be accurately measured based on an RSSI corresponding to each ONU.

According to a second aspect, this application provides a link status measurement method. In the method, a passive optical network PON includes a first optical line terminal OLT and a second OLT. The first OLT includes a first port, the second OLT includes a second port, and a first PON channel and a second PON channel are carried on a link between the second port and a first optical network unit ONU. The first ONU is one of at least one ONU included in the PON, the first PON channel is used to transmit a measurement signal, the second PON channel is used to transmit a service signal, and an optical wavelength corresponding to the measurement signal is different from an optical wavelength corresponding to the service signal. The first OLT sends first indication information to the first ONU and the second OLT. The first indication information indicates a measurement window for measuring the first ONU. The second OLT receives the first indication information, and measures a signal received by the second port from the first PON channel in the measurement window, to obtain quality of a signal corresponding to the first ONU. The signal received by the second port includes a measurement signal sent by the first ONU in the measurement window. The second OLT sends measurement information to the first OLT. The measurement information includes quality of a signal corresponding to each ONU in the PON. This enables the first OLT to determine quality of a backbone link based on the quality of the signal corresponding to each ONU. The backbone link is a common part of a link from the second port to each ONU.

Because the first OLT sends the first indication information to the second OLT and the first ONU, and the first indication information indicates the measurement window for measuring the first ONU, the first ONU sends a signal on the first PON channel in the measurement window. In this way, the second OLT measures the quality of the signal received by the second port in the measurement window, to obtain the quality of the signal corresponding to the first ONU. By repeating the foregoing process, the quality of the signal corresponding to each ONU in the PON can be obtained, and the quality of the signal corresponding to each ONU is sent to the first OLT. In this way, a status of a backbone link can be accurately determined based on the quality of the signal corresponding to each ONU. A service is switched to the backbone link only when the status of the backbone link is a normal state, so that the service can be normally transmitted on the backbone link. Therefore, the link status detection method ensures that the service can be run normally after link switching.

In addition, the status of the backbone link is determined based on the quality of the signal corresponding to each ONU. Therefore, precision of measuring the status of the backbone link is improved. In addition, a measurement window is provided for the first ONU, and the quality of the signal corresponding to the first ONU is measured in the measurement window. In this way, the quality of the signal corresponding to the first ONU can be measured in a short time, and a time length of the measurement window may be set to be short. Therefore, although a measurement window is separately provided for each ONU to separately obtain the quality of the signal corresponding to each ONU in a measurement window corresponding to each ONU, a total time length of the measurement window corresponding to each ONU is also short. This improves efficiency of measuring the status of the backbone link. The first PON channel and the second PON channel are carried on the link between the second port and the first ONU. The first PON channel is used to transmit the measurement signal, the second PON channel is used to transmit the service signal, and a dual-channel is used to transmit the measurement signal and the service signal. This ensures that service transmission between an OLT and each ONU in the PON is not affected when a link status is measured.

In a possible implementation, the first indication information includes at least one of start time of the measurement window and a time length of the measurement window. In this way, it is convenient for the second OLT and the first ONU to quickly determine the measurement window.

In another possible implementation, the measurement window includes at least one communication periodicity, and each communication periodicity includes a first time period and a send window corresponding to each ONU. A send window corresponding to the first ONU is a window for the first ONU to send an operation and maintenance service to the first OLT, and the first indication information indicates the first ONU to send the measurement signal in the first time period. In this way, each ONU may separately send the operation and maintenance service in the send window corresponding to each ONU, to avoid impact on the operation and maintenance service.

In another possible implementation, the quality of the signal corresponding to the first ONU includes at least one received signal strength indication RSSI, and the at least one RSSI is an RSSI of the signal received by the second port in the measurement window. Because an RSSI signal is easy to be measured, the status of the backbone link can be accurately measured based on an RSSI corresponding to each ONU.

According to a third aspect, this application provides a link status measurement apparatus, configured to perform the method according to any one of the first aspect or the possible implementations of the first aspect. Specifically, the apparatus includes a unit configured to perform the method according to any one of the first aspect or the possible implementations of the first aspect.

According to a fourth aspect, this application provides a link status measurement apparatus, configured to perform the method according to any one of the second aspect or the possible implementations of the second aspect. Specifically, the apparatus includes a unit configured to perform the method according to any one of the second aspect or the possible implementations of the second aspect.

According to a fifth aspect, this application provides a link status measurement apparatus. The apparatus includes a processor and a memory. The processor and the memory may be connected through an internal connection. The memory is configured to store a program, and the processor is configured to execute the program in the memory, to enable the apparatus to complete the method according to any one of the first aspect or the possible implementations of the first aspect.

According to a sixth aspect, this application provides a link status measurement apparatus. The apparatus includes a processor and a memory. The processor and the memory may be connected through an internal connection. The memory is configured to store a program, and the processor is configured to execute the program in the memory, to enable the apparatus to complete the method according to any one of the second aspect or the possible implementations of the second aspect.

According to a seventh aspect, this application provides a computer program product. The computer program product includes a computer program stored in a computer-readable storage medium, and computer program is loaded by a processor to implement the method according to any one of the first aspect, the second aspect, the possible implementations of the first aspect, or the possible implementations of the second aspect.

According to an eighth aspect, this application provides a computer-readable storage medium, configured to store a computer program. The computer program is loaded by a processor to perform the method according to any one of the first aspect, the second aspect, the possible implementations of the first aspect, or the possible implementations of the second aspect.

According to a ninth aspect, this application provides a chip, including a memory and a processor. The memory is configured to store computer instructions, and the processor is configured to invoke the computer instructions from the memory and run the computer instructions, to perform the method according to any one of the first aspect, the second aspect, the possible implementations of the first aspect, or the possible implementations of the second aspect.

According to a tenth aspect, this application provides a link status measurement system. The system includes the apparatus according to the third aspect and the apparatus according to the fourth aspect, or the system includes the apparatus according to the fifth aspect and the apparatus according to the sixth aspect.

DETAILED DESCRIPTION OF ILLUSTRATIVE EMBODIMENTS

The following further describes in detail embodiments of this application with reference to accompanying drawings.

Figure 1:
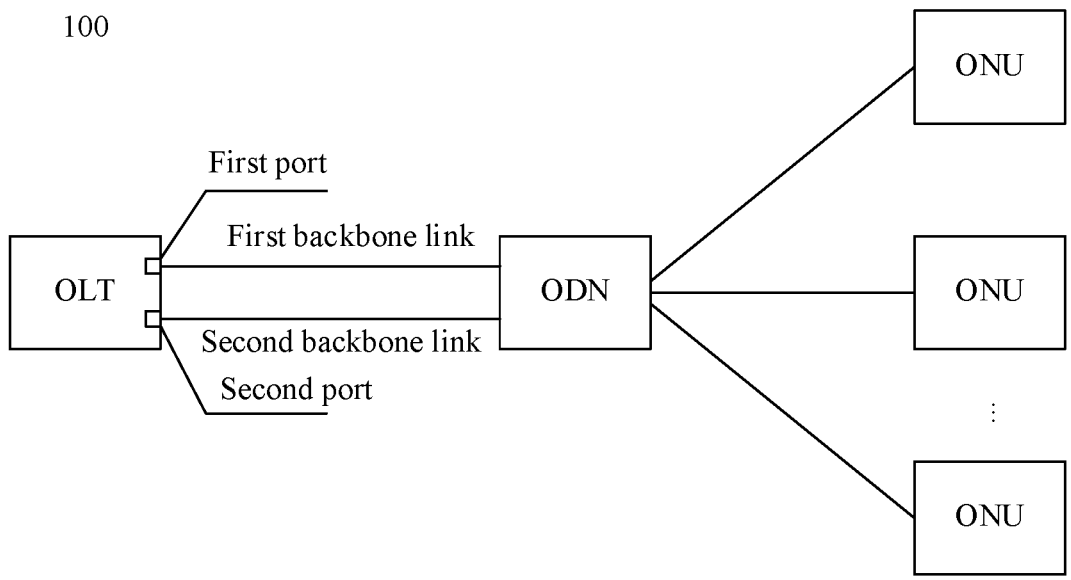
FIG. 1 is a schematic diagram of a PON architecture for implementing a single-homing protection technology according to an embodiment of this application.

Refer to FIG. 1. A PON is a communication network that uses an optical signal as an information dissemination carrier. The PON is a bidirectional optical access network with a point-to-multipoint structure. The PON includes an OLT located at a local end, an optical distribution network (ODN), and an ONU located at a user side. The OLT communicates with each ONU through the ODN. In a downlink direction, a signal sent by the OLT reaches each ONU through the ODN. For each ONU, a signal sent by the ONU reaches the OLT through the ODN.

The OLT includes a port. The port on the OLT is connected to the ODN through a backbone link, and the ODN is connected to each ONU through a branch link. For any ONU, a link between the port on the OLT and the ONU includes a backbone link between the port on the OLT and the ODN and a branch link between the ODN and the ONU.

The link between the port on the OLT and the ONU is used to carry a PON channel, and the PON channel is a channel established by the OLT and the ONU on the link. The OLT sends a downlink signal to the ONU through the PON channel, and the ONU sends an uplink signal to the OLT through the PON channel.

In some embodiments, for the link between the port on the OLT and the ONU, PON channels carried on the link include two types of PON channels, and the two types of PON channels are respectively a first-type PON channel and a second-type PON channel. An optical wavelength corresponding to a signal that can be transmitted on the first-type PON channel is different from an optical wavelength corresponding to a signal that can be transmitted on the second-type PON channel.

The optical wavelength corresponding to the signal that can be transmitted on the first-type PON channel includes an optical wavelength corresponding to a first uplink signal and an optical wavelength corresponding to a first downlink signal. The optical wavelength corresponding to the first uplink signal and the optical wavelength corresponding to the first downlink signal are two different optical signal wavelengths. The optical wavelength corresponding to the signal that can be transmitted on the second-type PON channel includes an optical wavelength corresponding to a second uplink signal and an optical wavelength corresponding to a second downlink signal. The optical wavelength corresponding to the second uplink signal and the optical wavelength corresponding to the second downlink signal are two different optical signal wavelengths.

That an optical wavelength corresponding to a signal that can be transmitted on the first-type PON channel is different from an optical wavelength corresponding to a signal that can be transmitted on the second-type PON channel means: An optical wavelength corresponding to a first uplink signal that can be transmitted on the first-type PON channel is different from an optical wavelength corresponding to a second uplink signal that can be transmitted on the second-type PON channel, and an optical wavelength corresponding to a first downlink signal that can be transmitted on the first-type PON channel is different from an optical wavelength corresponding to a second downlink signal that can be transmitted on the second-type PON channel.

The first-type PON channel is used to transmit a signal of an operation and maintenance service, and the second-type PON channel is used to transmit a signal of a data service. For example, the first-type PON channel may be a gigabit-capable passive optical network (GPON) channel, an optical wavelength corresponding to a first uplink signal that can be transmitted on the GPON channel may be equal to 1270 nm, and an optical wavelength corresponding to a first downlink signal that can be transmitted on the GPON channel may be equal to 1577 nm. Alternatively, an optical wavelength corresponding to a first uplink signal that can be transmitted on the GPON channel may be equal to 1577 nm, and an optical wavelength corresponding to a first downlink signal that can be transmitted on the GPON channel may be equal to 1270 nm. The second-type PON channel may be a 10-gigabit-capable symmetric passive optical network (XGS-PON) channel, an optical wavelength corresponding to a first uplink signal that can be transmitted on the XGS-PON channel may be equal to 1310 nm, and an optical wavelength corresponding to a first downlink signal that can be transmitted on the XGS-PON channel may be equal to 1490 nm. Alternatively, an optical wavelength corresponding to a first uplink signal that can be transmitted on the XGS-PON channel may be equal to 1490 nm, and an optical wavelength corresponding to a first downlink signal that can be transmitted on the XGS-PON channel may be equal to 1310 nm.

In some embodiments, the ODN includes one or more optical splitters. The backbone link and the branch link include an optical fiber and the like. The PON channels are logic channels.

A PON protection technology includes a single-homing protection technology and a dual-homing protection technology.

Refer to a PON architecture boo for implementing the single-homing protection technology shown in FIG. 1. The PON architecture boo for implementing the single-homing protection technology includes an OLT, and the OLT includes two ports: a first port and a second port. The first port is connected to the ODN through a first backbone link, and the second port is connected to the ODN through a second backbone link.

For the first port and the second port on the OLT, one port is an active port, and the other port is a standby port. When a backbone link connected to the active port is normal, through the active port, the OLT sends a service to each ONU or receives a service sent by each ONU. When the backbone link connected to the active port is faulty, the OLT switches the service to the standby interface, in other words, when the backbone link connected to the active port is faulty, through the standby port, the OLT sends the service to each ONU or receives the service sent by each ONU.

When the OLT transmits the service to each ONU by using the active port, the OLT further measures quality of a backbone link connected to the standby port, and when it is measured that the backbone link connected to the standby port is faulty, an administrator may be notified for repairing.

When the backbone link connected to the active port is faulty, the OLT switches the service to the standby interface, the OLT further measures quality of the backbone link connected to the active port, and when it is measured that the backbone link connected to the active port recovers, the OLT switches the service to the active port.

For any ONU, for ease of description, a link between the first port and the ONU is referred to as a first link. The first link includes a first backbone link between the first port and the ODN and a branch link between the ODN and the ONU. In addition, a link between the second port and the ONU is referred to as a second link. The second link includes a second backbone link between the second port and the ODN and the branch link between the ODN and the ONU. The branch link between the ODN and the ONU is a common branch link included in the first link and the second link.

In some embodiments, the second link between the second port and the ONU carries two types of PON channels: a first PON channel and a second PON channel. The first link between the first port and the ONU carries two types of PON channels: a third PON channel and a fourth PON channel.

The third PON channel carried on the first link and the first PON channel carried on the second link are channels of a same type, and both are first-type PON channels. In other words, for the first PON channel carried on the second link and the third PON channel carried on the first link, an optical wavelength corresponding to a signal that can be transmitted on the first PON channel is the same as an optical wavelength corresponding to a signal that can be transmitted on the third PON channel, and both are used to transmit the signal of the operation and maintenance service.

The second PON channel on the second link and the fourth PON channel on the first link are channels of a same type, and both are second-type PON channels. In other words, for the fourth PON channel carried on the first link and the second PON channel carried on the second link, an optical wavelength corresponding to a signal that can be transmitted on the fourth PON channel is the same as an optical wavelength corresponding to a signal that can be transmitted on the second PON channel, and both are used to transmit the signal of the data service. However, the optical wavelength corresponding to the signal that can be transmitted on the third PON channel is different from the optical wavelength corresponding to the signal that can be transmitted on the fourth PON channel. The optical wavelength corresponding to the signal that can be transmitted on the first PON channel is different from the optical wavelength corresponding to the signal that can be transmitted on the second PON channel.

Figure 2:
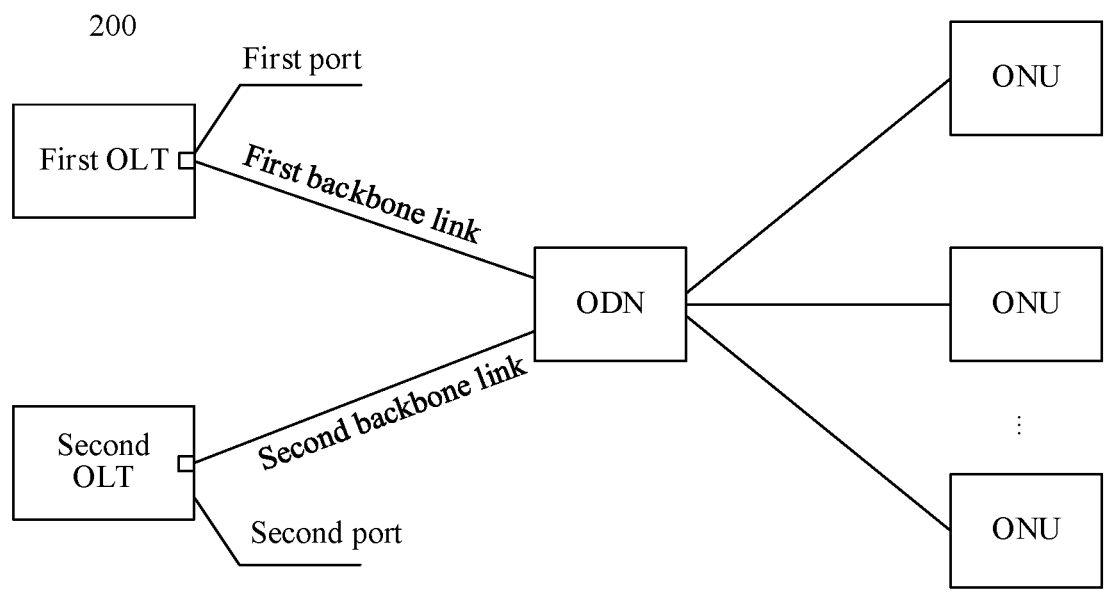
FIG. 2 is a schematic diagram of a PON architecture for implementing a dual-homing protection technology according to an embodiment of this application.

Refer to a PON architecture 200 for implementing the dual-homing protection technology shown in FIG. 2. The PON architecture 200 for implementing the dual-homing protection technology includes two OLTs: a first OLT and a second OLT. The first OLT includes a first port, and the second OLT includes a second port. The first port is connected to an ODN through a first backbone link, and the second port is connected to the ODN through a second backbone link.

For the first OLT and the second OLT, one OLT is an active OLT, a port on the active OLT is an active port, the other OLT is a standby OLT, and a port on the standby OLT is a standby port. When a backbone link connected to the active port on the active OLT is normal, through the active port, the active OLT sends a service to each ONU or receives a service sent by each ONU. When the backbone link connected to the active port on the active OLT is faulty, the active OLT switches the service to the standby interface on the standby OLT, in other words, when the backbone link connected to the active port on the active OLT is faulty, through the standby port, the standby OLT sends the service to each ONU or receives the service sent by each ONU.

When the active OLT transmits the service to each ONU by using the active port, the active OLT measures quality of a backbone link connected to the standby port, and when it is measured that the backbone link connected to the standby port is faulty, an administrator may be notified for repairing.

When the backbone link connected to the active port on the active OLT is faulty, the active OLT switches the service to the standby interface on the standby OLT, measures quality of the backbone link connected to the active port, and when it is measured that the backbone link connected to the active port recovers, the active OLT switches the service to the active port.

For any ONU, for ease of description, a link between a first port on the first OLT and the ONU is referred to as a first link. The first link includes a first backbone link between the first port on the first OLT and the ODN and a branch link between the ODN and the ONU. A link between a second port on the second OLT and the ONU is referred to as a second link. The second link includes a second backbone link between the second port on the second OLT and the ODN and the branch link between the ODN and the ONU. The branch link between the ODN and the ONU is a common branch link included in the first link and the second link.

In some embodiments, the second link between the second port on the second OLT and the ONU carries two types of PON channels: a first PON channel and a second PON channel. The first link between the first port on the first OLT and the ONU carries two types of PON channels: a third PON channel and a fourth PON channel.

The third PON channel carried on the first link and the first PON channel carried on the second link are channels of a same type, and both are first-type PON channels. In other words, for the first PON channel carried on the second link and the third PON channel carried on the first link, an optical wavelength corresponding to a signal that can be transmitted on the first PON channel is the same as an optical wavelength corresponding to a signal that can be transmitted on the third PON channel, and both are used to transmit a signal of an operation and maintenance service.

The second PON channel on the second link and the fourth PON channel on the first link are channels of a same type, and both are second-type PON channels. In other words, for the fourth PON channel carried on the first link and the second PON channel carried on the second link, an optical wavelength corresponding to a signal that can be transmitted on the fourth PON channel is the same as an optical wavelength corresponding to a signal that can be transmitted on the second PON channel, and both are used to transmit a signal of a data service. However, the optical wavelength corresponding to the signal that can be transmitted on the third PON channel is different from the optical wavelength corresponding to the signal that can be transmitted on the fourth PON channel. The optical wavelength corresponding to the signal that can be transmitted on the first PON channel is different from the optical wavelength corresponding to the signal that can be transmitted on the second PON channel.

No matter in the network architecture 100 or the network architecture 200, for either of the first port and the second port, when a service is transmitted through the port, the port has the following feature: The port sends a signal to any ONU, and the port receives a signal sent by any ONU. The other port has the following feature: The other port cannot send the signal to any ONU, but the other port can receive the signal sent by any ONU.

In some embodiments, for the first port and any ONU, a link between the first port and the ONU carries two PON channels that can transmit signals with different optical wavelengths. A link between the second port and the ONU also carries two PON channels that can transmit signals with different optical wavelengths.

Figure 3:
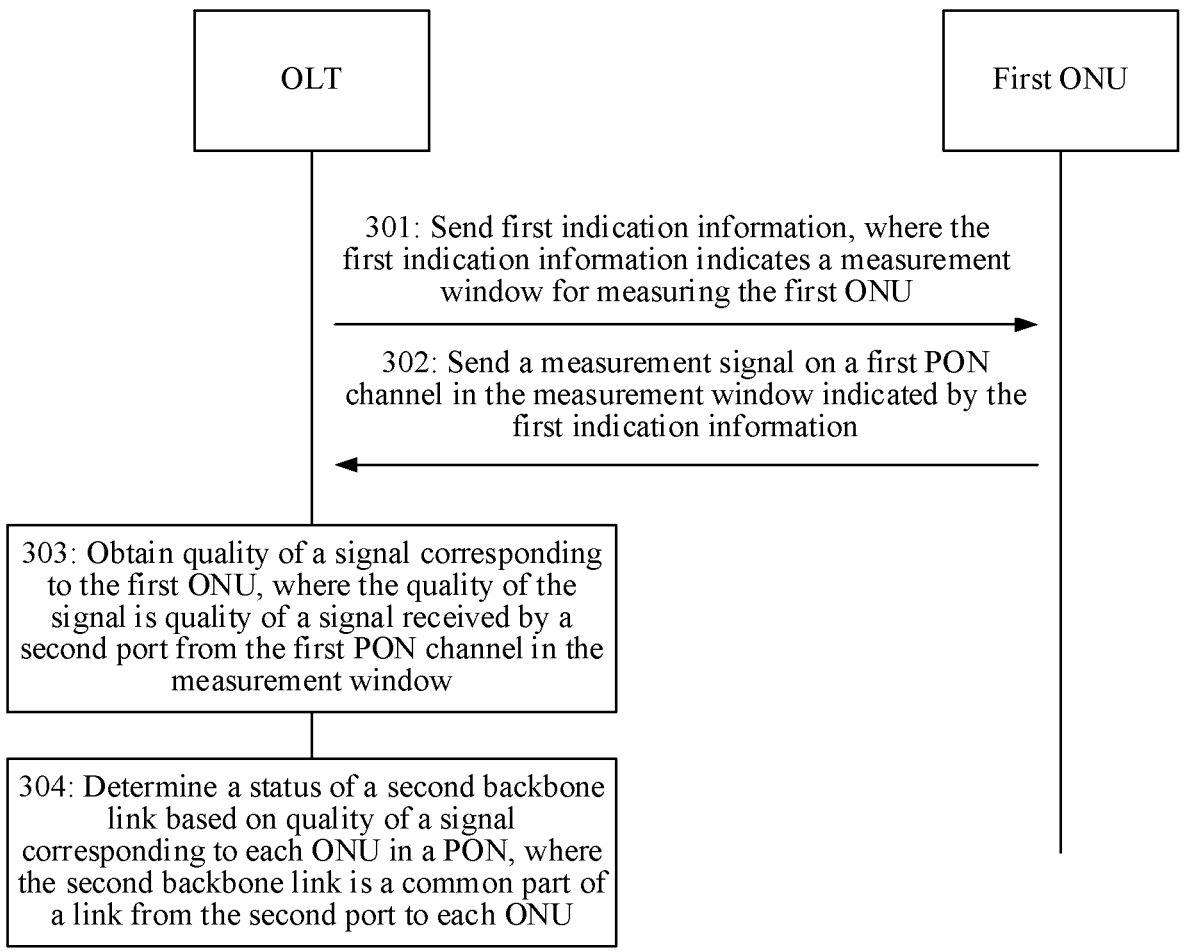
FIG. 3 is a flowchart of a link status measurement method according to an embodiment of this application.

Refer to FIG. 3. An embodiment of this application provides a link status measurement method 300. The method 300 is applied to the PON architecture 100 shown in FIG. 1, and the PON architecture 100 is for implementing a single-homing protection technology. For an OLT in the PON architecture 100, it is assumed that a first port on the OLT is a port currently used by the OLT to communicate a service with each ONU in the PON loft That is, through the first port, the OLT sends a service to each ONU or receives a service sent by each ONU. The method 300 includes:

Step 301: The OLT sends first indication information to a first ONU through the first port, where the first indication information indicates a measurement window for measuring the first ONU, and the first ONU is any ONU in a PON.

In some embodiments, that the first indication information indicates a measurement window for measuring the first ONU includes: The first indication information indicates the measurement window and indicates the first ONU to send a measurement signal in the measurement window.

The OLT includes the first port and a second port. The first port is a port currently used to transmit the service on the OLT, that is, the OLT communicates the service with an ONU in the PON through the first port. The first port has the following feature: The first port sends a signal to the ONU in the PON, and the first port receives a signal sent by the ONU in the PON. The second port has the following feature: The second port receives the signal sent by the ONU in the PON, but the second port cannot send a signal to the ONU in the PON.

The first port may be an active port on the OLT, and the second port may be a standby port on the OLT. Alternatively, the first port may be a standby port on the OLT, and the second port may be an active port on the OLT.

For any ONU in the PON, that is, for the first ONU, a first link between the first port and the first ONU carries a third PON channel and a fourth PON channel. A second link between the second port and the first ONU carries a first PON channel and a second PON channel.

Both the third PON channel and the first PON channel are first-type PON channels. Therefore, the OLT sends an operation and maintenance service to the ONU in the PON on the third PON channel through the first port. When the ONU in the PON sends an operation and maintenance service to the OLT, the OLT receives, on the third PON channel through the first port, the operation and maintenance service sent by the ONU in the PON. In addition, the second port can also receive, on the first PON channel, the operation and maintenance service sent by the ONU in the PON.

Both the second PON channel and the fourth PON channel are second-type PON channels. Therefore, the OLT sends a data service to the ONU in the PON on the fourth PON channel through the second port. When the ONU in the PON sends a data service to the OLT, the OLT receives, on the fourth PON channel through the first port, the data service sent by the ONU in the PON. In addition, the second port can receive, on the second PON channel, the data service sent by the ONU in the PON.

In some embodiments, that the first indication information indicates the first ONU to send a measurement signal in the measurement window includes: The first indication information indicates the first ONU to send the measurement signal in the measurement window through the first-type PON channel. The first-type PON channel includes the first PON channel and the third PON channel.

In step 301, the OLT sends the first indication information to the first ONU on the third PON channel or the fourth PON channel through the first port.

In some embodiments, the first indication information includes one or more of start time, a time length, and the like of the measurement window. Alternatively, the first indication information may not include information such as start time and a time length of the measurement window. In other words, the first indication information has the following four cases.

In a first case, the first indication information includes the start time and the time length of the measurement window.

In a second case, the first indication information includes the start time of the measurement window. In the second case, both the OLT and the first ONU include the time length of the measurement window. The time length may be a time length agreed upon by the OLT and the first ONU in advance, a time length that is configured by a skilled person and that is received by the OLT and the first ONU in advance, a time length that is configured by a control device and that is received by the OLT and the first ONU in advance, or the like.

In a third case, the first indication information includes the time length of the measurement window. In the third case, a time difference between the start time of the measurement window and receiving time at which the first ONU receives the first indication information is a specified time difference, and the specified time difference is greater than or equal to 0.

In a fourth case, the first indication information does not include the start time and the time length of the measurement window. In the fourth case, the time difference between the start time of the measurement window and the receiving time at which the first ONU receives the first indication information is the specified time difference, and the specified time difference is greater than or equal to 0. Both the OLT and the first ONU include the time length of the measurement window. The time length may be the time length agreed upon by the OLT and the first ONU in advance, the time length that is configured by a skilled person and that is received by the OLT and the first ONU in advance, the time length that is configured by the control device and that is received by the OLT and the first ONU in advance, or the like.

In some embodiments, the time length of the measurement window is a specified time length or a time length configured by the OLT.

In some embodiments, the time length of the measurement window reaches several seconds or tens of seconds. For example, the time length of the measurement window is 3 seconds, 5 seconds, 8 seconds, 10 seconds, 20 seconds, 30 seconds, or the like. In this way, sufficient time is available in the measurement window to measure the first ONU, and precision of measuring the first ONU is improved.

In some embodiments, the foregoing measurement windows are classified into two types, and the two types of measurement windows are respectively as follows:

First-type measurement window: In the measurement window, only the first ONU is allowed to send a signal to the OLT on the first-type PON channel, and another ONU other than the first ONU in the PON is not allowed to send a signal to the OLT.

Because only the first ONU sends the signal on the first-type PON channel in the measurement window, all signals received by the OLT in the measurement window are sent by the first ONU. This improves precision of link measurement.

Second-type measurement window: The measurement window includes at least one sending periodicity, and each sending periodicity includes a first time period and a send window corresponding to each ONU in the PON. A send window corresponding to the first ONU is a window for the first ONU to send an operation and maintenance service to the OLT, and the first indication information indicates the first ONU to send the signal in the first time period.

For example, it is assumed that the measurement window includes boo sending periodicities, a periodicity length of one sending periodicity is 125 microseconds, the PON includes 10 ONUs, and a time length of the send window corresponding to each ONU is 2 microseconds. Therefore, one sending periodicity includes 10 send windows, 20 microseconds in total, and a time length of the first time period is 105 microseconds.

The first time period occupies most of time of an entire sending periodicity. Therefore, most signals received by the OLT in the measurement window are signals sent by the first ONU, and measuring the first ONU based on the received signal can complete measurement of the link status. In addition, in the measurement window, each ONU separately transmits an operation and maintenance service with the OLT in the send window corresponding to each ONU, to avoid impact on the operation and maintenance service.

No matter whether the measurement window is the first-type measurement window or the second-type measurement window, in the measurement window, the ONU in the PON may send a data service to the OLT through the second-type PON channel, and/or receive a data service sent by the OLT, so that a process of transmitting the data service is isolated from a process of measuring the first ONU, and transmission of the data service is not affected.

Step 302: The first ONU receives the first indication information, and sends a measurement signal to the OLT on the first PON channel in the measurement window indicated by the first indication information.

The first link includes a first backbone link between the first port on the OLT and an ODN and a branch link between the ODN and the first ONU, and the second link includes a second backbone link between a second port on the OLT and the ODN and the branch link between the ODN and the first ONU. Therefore, the first link and the second link include a common branch link. However, the first PON channel is carried on the first link, the third PON channel is carried on the second link, and the first PON channel and the third PON channel are PON channels of a same type that can transmit signals with a same optical wavelength. Therefore, in the measurement window, the first ONU sends the measurement signal on the first PON channel and the third PON channel at the same time.

In some embodiments, the measurement signal sent by the first ONU includes one or more of a signal randomly generated by the OLT, a signal stored in the OLT in advance, and the like.

In some embodiments, in the measurement window, the first ONU can further send a service signal on the fourth PON channel carried on the first link and the second PON channel carried on the second link. The service signal is a signal of the data service, and an optical wavelength corresponding to the measurement signal is different from an optical wavelength corresponding to the service signal. In other words, transmission of the data service in the PON is not affected in the measurement window.

In step 302, the first ONU receives the first indication information, determines, based on the first indication information, the measurement window indicated by the first indication information, and sends the measurement signal to the OLT on the first PON channel in the measurement window.

The first indication information includes the first indication information in the first case, the second case, the third case, or the fourth case. For the first indication information in the four cases, the following separately describes a process of determining the measurement window based on the first indication information in each case. Details are as follows.

For the first indication information in the first case, the first indication information includes the start time and the time length of the measurement window. The first ONU obtains the start time and the time length of the measurement window from the first indication information, and determines the measurement window based on the start time and the time length of the measurement window.

For the first indication information in the second case, the first indication information includes the start time of the measurement window. In the second case, the first ONU includes the time length of the measurement window. The first ONU obtains the start time of the measurement window from the first indication information, and determines the measurement window based on the start time and the time length of the measurement window.

For the first indication information in the third case, the first indication information includes the time length of the measurement window. The first ONU obtains the time length of the measurement window from the first indication information, and obtains receiving time at which the first indication information is received. The first ONU calculates the start time of the measurement window based on the receiving time and the specified time difference, and determines the measurement window based on the start time and the time length of the measurement window.

For the first indication information in the fourth case, the first indication information does not include the start time and the time length of the measurement window. In the fourth case, the first ONU includes the time length of the measurement window. The first ONU obtains the receiving time at which the first indication information is received, calculates the start time of the measurement window based on the receiving time and the specified time difference, and determines the measurement window based on the start time and the time length of the measurement window.

In some embodiments, the determined measurement windows are classified into the first-type measurement window and the second-type measurement window. When the measurement window is the first-type measurement window, in the first-type measurement window, the first ONU sends the measurement signal to the OLT on the first-type PON channel, that is, sends the measurement signal to the OLT on the first PON channel and the third PON channel. In the first-type measurement window, another ONU other than the first ONU in the PON does not send the measurement signal to the OLT on the first-type PON channel.

When the measurement window is the second-type measurement window, the second-type measurement window includes at least one sending periodicity, and each sending periodicity includes the first time period and the send window corresponding to each ONU in the PON. In any sending periodicity, the first ONU sends the measurement signal to the OLT on the first PON channel and the third PON channel in the first time period, and each ONU in the PON may send the operation and maintenance service in the send window corresponding to each ONU.

Step 303: The OLT obtains quality of a signal corresponding to the first ONU, where the quality of the signal is quality of a signal received by the second port from the first PON channel in the measurement window, and the signal received by the second port includes the measurement signal sent by the first ONU in the measurement window.

In step 303, the OLT obtains the quality of the signal corresponding to the first ONU by performing the following operations 3031 and 3032. Operations 3031 and 3032 are respectively as follows.

3031: The OLT determines the measurement window, and receives the measurement signal on the first PON channel through the second port in the measurement window.

The first indication information sent by the OLT includes the first indication information in the first case, the second case, the third case, or the fourth case. For the first indication information in the four cases, the following describes the process of determining the measurement window in each case. Details are as follows.

For the first indication information in the first case, the first indication information includes the start time and the time length of the measurement window. The OLT determines the measurement window based on the start time and the time length of the measurement window.

For the first indication information in the second case, the first indication information includes the start time of the measurement window. In the second case, the OLT includes the time length of the measurement window. The OLT determines the measurement window based on the start time and the time length of the measurement window.

For the first indication information in the third case, the first indication information includes the time length of the measurement window. The OLT includes pre-measured signal transmission duration between the first port and the first ONU, and the OLT obtains, based on the signal transmission duration and sending time at which the first indication information is sent, the receiving time at which the first ONU receives the first indication information. The OLT calculates the start time of the measurement window based on the receiving time and the specified time difference, and determines the measurement window based on the start time and the time length of the measurement window.

For the first indication information in the fourth case, the first indication information does not include the start time and the time length of the measurement window. In the fourth case, the OLT includes the time length of the measurement window and the pre-measured signal transmission duration between the first port and the first ONU. The OLT obtains, based on the signal transmission duration and the sending time at which the first indication information is sent, the receiving time at which the first ONU receives the first indication information. The OLT calculates the start time of the measurement window based on the receiving time and the specified time difference, and determines the measurement window based on the start time and the time length of the measurement window.

It should be noted that the measurement window may be the first-type measurement window or the second-type measurement window. When the measurement window is the first-type measurement window, the OLT receives, on the third PON channel through the first port, the measurement signal sent by the first ONU, and the OLT does not process the measurement signal received by the first port.

When the measurement window is the second-type measurement window, the measurement window includes at least one sending periodicity, and each sending periodicity includes the send window corresponding to each ONU in the PON and the first time period. Therefore, in a send window corresponding to any ONU, the OLT may receive, on the third PON channel through the first port, an operation and maintenance service sent by the ONU, and process the operation and maintenance service. However, the OLT receives, on the third PON channel through the first port in the first time period, the measurement signal sent by the first ONU, and the OLT does not process a measurement signal received by the first port in the first time period.

3032: The OLT measures the signal received by the second port on the first PON channel, to obtain the quality of the signal corresponding to the first ONU.

The quality of the signal corresponding to the first ONU includes at least one received signal strength indication (RSSI), and the at least one RSSI is an RSSI of a signal received by the second port in the measurement window. In other words, the OLT performs at least one measurement on the signal received by the second port on the first PON channel, to obtain the at least one RSSI.

It should be noted that the measurement window may be the first-type measurement window or the second-type measurement window. When the measurement window is the first-type measurement window, all signals received by the second port on the first PON channel are measurement signals sent by the first ONU. Therefore, precision of measuring the quality of the signal corresponding to the first ONU is improved. When the measurement window is the second-type measurement window, most of the time of each sending periodicity in the measurement window is the first time period, and the first ONU sends the measurement signal on the first PON channel in the first time period of each sending periodicity. Therefore, most of the signals received by the second port on the first PON channel are measurement signals sent by the first ONU. This ensures that the quality of the signal corresponding to the first ONU is close to quality of a measurement signal that is sent by the first ONU and that is received by the OLT.

For each ONU other than the first ONU in the PON, the foregoing process of steps 301 to 303 is repeated to obtain quality of a signal corresponding to each other ONU, to obtain quality of a signal corresponding to each ONU in the PON, and then the following operation of step 304 is performed.

Step 304: The OLT determines a status of the second backbone link based on the quality of the signal corresponding to each ONU in the PON, where the second backbone link is a common part of a link from the second port to each ONU.

The second backbone link is a backbone link between the second port and the ODN.

In step 304, the OLT determines whether the quality of the signal corresponding to each ONU in the PON exceeds a specified quality threshold. If the quality of the signal corresponding to each ONU in the PON exceeds the specified quality threshold, it is determined that the status of the second backbone link is a normal state. If not all of the quality of the signal corresponding to each ONU in the PON exceeds the specified quality threshold, it is determined that the status of the second backbone link is a faulty state.

In some embodiments, the quality of the signal corresponding to the first ONU includes at least one RSSI, and when all the at least one RSSI exceeds the specified quality threshold, it is determined that the quality of the signal corresponding to the first ONU exceeds the specified quality threshold. When not all of the at least one RSSI exceeds the specified quality threshold, it is determined that the quality of the signal corresponding to the first ONU does not exceed the specified quality threshold.

When the first port is an active port, the second port is a standby port. After it is determined that the status of the second backbone link is the normal state, the process of 301 to 304 may be repeatedly performed to continue to determine the status of the second backbone link. After it is determined that the status of the second backbone link is the faulty state, a skilled person may be notified for repairing. When the first backbone link is faulty, a service between the OLT and each ONU in the PON is switched to the second port.

When the first port is the standby port, the second port is the active port. After it is determined that the status of the second backbone link is the normal state, the service between the OLT and each ONU in the PON may be switched to the second port, and then the process of 301 to 304 is repeatedly performed to determine a status of a first backbone link connected to the first port. After it is determined that the status of the second backbone link is the faulty state, a skilled person may be notified for repairing.

In this embodiment of this application, the OLT sends the first indication information to the first ONU through the first port, and the first indication information indicates the measurement window for measuring the first ONU. Therefore, the first ONU determines the measurement window based on the first indication information, and sends a signal to the OLT on the first PON channel in the measurement window. The OLT receives the signal on the first PON channel through the second port, and measures the signal to obtain the quality of the signal corresponding to the first ONU. By repeating the foregoing process, the quality of the signal corresponding to each ONU can be obtained. In this way, the OLT determines the status of the backbone link based on the quality of the signal corresponding to each ONU. A service is switched to the backbone link only when the status of the backbone link is the normal state, so that the service can be normally transmitted on the backbone link. Therefore, the link status detection method ensures that the service can be run normally after link switching. Because the quality of the signal corresponding to each ONU is obtained, it is determined that the status of the backbone link is the normal state only when the quality of the signal corresponding to each ONU exceeds the specified quality threshold, to improve precision of determining the status of the backbone link. In addition, a measurement window is specified for each ONU, and the quality of the signal corresponding to each ONU is measured in each measurement window, so that a time length of each measurement window may be configured to be short, only several seconds or tens of seconds, and time needed for measuring the quality of the signal corresponding to each ONU is short. Therefore, the quality of the signal corresponding to each ONU can be obtained in short time, to improve efficiency of measuring the backbone link. In addition, the quality of the signal corresponding to each ONU includes at least one RSSI, and the RSSI can be easily measured. Therefore, based on the at least one RSSI corresponding to each ONU, precision of measuring the status of the backbone link is further improved.

Figure 4:
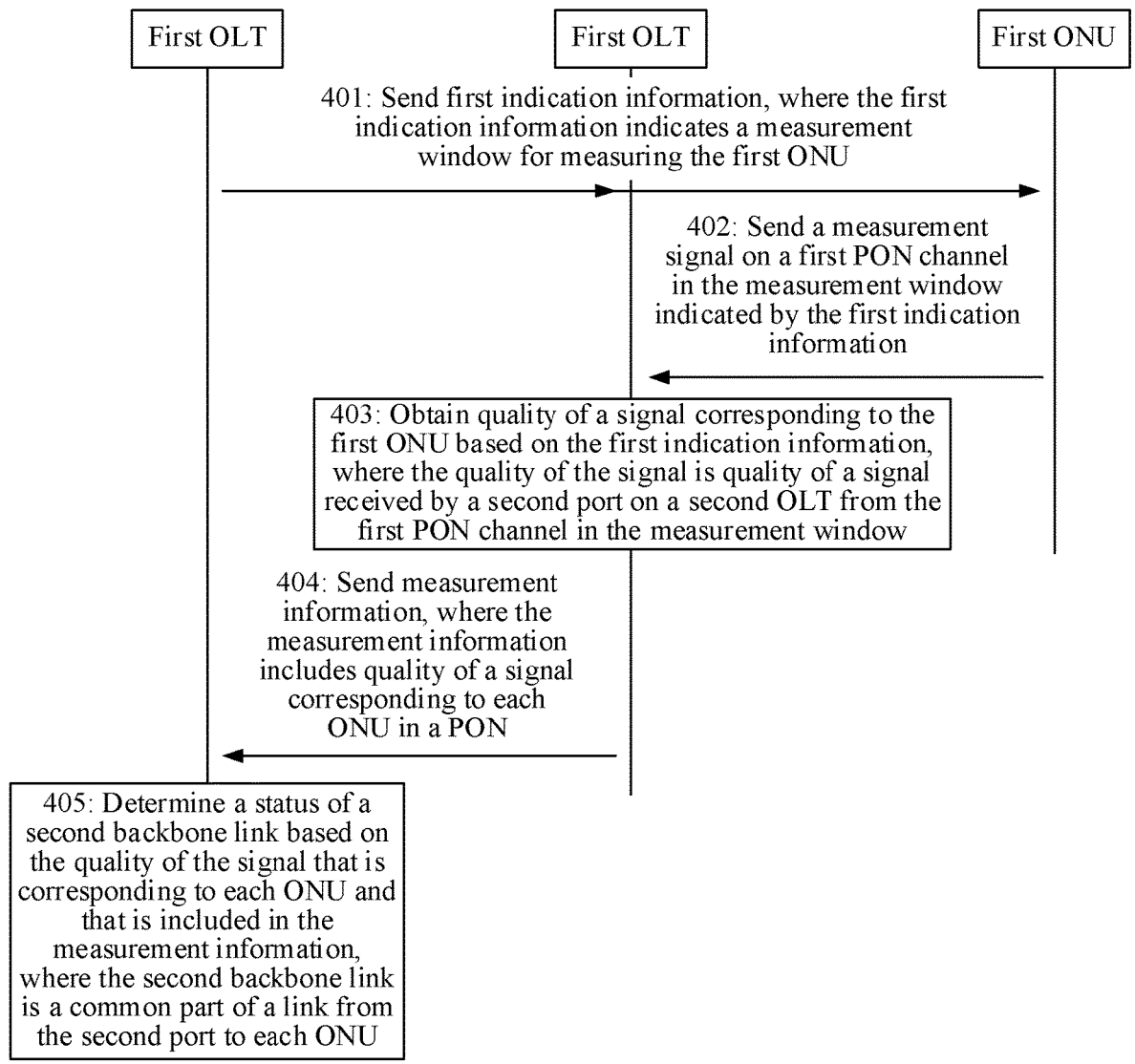
FIG. 4 is a flowchart of another link status measurement method according to an embodiment of this application.

Refer to FIG. 4. An embodiment of this application provides a link status measurement method 400. The method 400 is applied to the PON architecture 200 shown in FIG. 2, and the PON architecture 200 is for implementing a dual-homing protection technology. For a first OLT and a second OLT in the PON architecture 200, it is assumed that a first port on the first OLT is a port currently used by an OLT to communicate a service with each ONU in the PON 200. That is, through the first port, the first OLT sends a service to each ONU or receives a service sent by each ONU. The method 400 includes:

Step 401: The first OLT sends first indication information to a first ONU and the second OLT through the first port, where the first indication information indicates a measurement window for measuring the first ONU, and the first ONU is any ONU in a PON.

In some embodiments, that the first indication information indicates a measurement window for measuring the first ONU includes: The first indication information indicates the measurement window and indicates the first ONU to send a measurement signal in the measurement window.

The first OLT includes the first port. The first OLT is an OLT currently used to transmit the service, and the first OLT currently transmits the service through the first port, that is, the first OLT communicates the service with an ONU in the PON through the first port. The first port on the first OLT has the following feature: The first OLT sends a signal to the ONU in the PON through the first port, and receives, through the first port, a signal sent by the ONU in the PON. A second port on the second OLT has the following feature: The second OLT receives, through the second port, the signal sent by the ONU in the PON, but the second OLT cannot send a signal to the ONU in the PON through the second port.

The first OLT may be an active OLT, the first port on the first OLT may be an active port, the second OLT may be a standby OLT, and the second port on the second OLT may be a standby port. Alternatively, the first OLT may be a standby OLT, the first port on the first OLT may be a standby port, the second OLT may be an active OLT, and the second port on the second OLT may be an active port.

For any ONU in the PON, that is, for the first ONU, a first link between the first port on the first OLT and the first ONU carries a third PON channel and a fourth PON channel. A second link between the second port on the second OLT and the first ONU carries a first PON channel and a second PON channel.

Both the third PON channel and the first PON channel are first-type PON channels. Therefore, the first OLT sends an operation and maintenance service to the ONU in the PON on the third PON channel through the first port. When the ONU in the PON sends an operation and maintenance service to the first OLT and the second OLT, the first OLT receives, on the third PON channel through the first port, the operation and maintenance service sent by the ONU in the PON, and the second OLT can also receive, on the first PON channel through the second port, the operation and maintenance service sent by the ONU in the PON.

Both the second PON channel and the fourth PON channel are second-type PON channels. Therefore, the first OLT sends a data service to the ONU in the PON on the fourth PON channel through the second port. When the ONU in the PON sends a data service to the first OLT and the second OLT, the first OLT receives, on the fourth PON channel through the first port, the data service sent by the ONU in the PON, and the second OLT can also receive, on the second PON channel through the second port, the data service sent by the ONU in the PON.

In some embodiments, that the first indication information indicates the first ONU to send a measurement signal in the measurement window includes: The first indication information indicates the first ONU to send the measurement signal in the measurement window through the first-type PON channel. The first-type PON channel includes the first PON channel and the third PON channel.

In step 401, the first OLT sends the first indication information to the first ONU on the third PON channel or the fourth PON channel through the first port.

In some embodiments, the first indication information includes one or more of start time, a time length, and the like of the measurement window. Alternatively, the first indication information may not include information such as start time and a time length of the measurement window. For detailed descriptions of the first indication information, refer to related content in step 301 of the method 300 shown in FIG. 3. Details are not described herein again.

In some embodiments, the foregoing measurement windows are classified into two types, and the two types of measurement windows are respectively a first-type measurement window and a second-type measurement window. For detailed descriptions of the first-type measurement window and the second-type measurement window, refer to related content in step 301 of the method 300 shown in FIG. 3. Details are not described herein again.

Step 402: The first ONU receives the first indication information, and sends a measurement signal to the second OLT on the first PON channel in the measurement window indicated by the first indication information.

The first link includes a first backbone link between the first port on the first OLT and an ODN and a branch link between the ODN and the first ONU, and the second link includes a second backbone link between the second port on the second OLT and the ODN and a branch link between the ODN and the first ONU. Therefore, the first link and the second link include a common branch link. However, the first PON channel is carried on the first link, the third PON channel is carried on the second link, and the first PON channel and the third PON channel are PON channels of a same type with a same wavelength. Therefore, in the measurement window, the first ONU sends the measurement signal to the second OLT on the first PON channel and sends the measurement signal to the first OLT on the third PON channel at the same time.

In some embodiments, in the measurement window, the first ONU can further send a service signal on the fourth PON channel carried on the first link and the second PON channel carried on the second link. The service signal is a signal of the data service, and an optical wavelength corresponding to the measurement signal is different from an optical wavelength corresponding to the service signal. In other words, transmission of the data service in the PON is not affected in the measurement window.

In step 402, for a detailed implementation process in which the first ONU sends the measurement signal to the second OLT, refer to related content in step 302 of the method 300 shown in FIG. 3. Details are not described herein again.

Step 403: The second OLT receives the first indication information, and obtains quality of a signal corresponding to the first ONU based on the first indication information, where the quality of the signal is quality of a signal received by the second port on the second OLT from the first PON channel in the measurement window, and the signal received by the second port includes the measurement signal sent by the first ONU in the measurement window.

In step 403, the OLT obtains the quality of the signal corresponding to the first ONU by performing the following operations 4031 to 4033. Operations 4031 to 4033 are respectively as follows.

4031: The second OLT receives the first indication information, and determines the measurement window based on the first indication information.

The first indication information received by the second OLT includes the first indication information in the first case, the second case, the third case, or the fourth case. For the first indication information in the four cases, the following describes a process of determining the measurement window in each case. Details are as follows.

For the first indication information in the first case, the first indication information includes the start time and the time length of the measurement window. The second OLT obtains the start time and the time length of the measurement window from the first indication information, and determines the measurement window based on the start time and the time length of the measurement window.

For the first indication information in the second case, the first indication information includes the start time of the measurement window. In the second case, the second OLT includes the time length of the measurement window. The second OLT obtains the start time of the measurement window from the first indication information, and determines the measurement window based on the start time and the time length of the measurement window.

For the first indication information in the third case, the first indication information includes the time length of the measurement window. The second OLT obtains signal transmission duration between the first port on the first OLT and the first ONU, and obtains sending time at which the first OLT sends the first indication information. The second OLT obtains the time length of the measurement window from the first indication information, and obtains, based on the signal transmission duration and sending time at which the first indication information is sent, receiving time at which the first ONU receives the first indication information. The second OLT calculates the start time of the measurement window based on the receiving time and a specified time difference, and determines the measurement window based on the start time and the time length of the measurement window.

In some embodiments, the first indication information includes the signal transmission duration and the sending time, and the signal transmission duration and the sending time are obtained from the first indication information.

In some embodiments, the second OLT includes the signal transmission duration, and the signal transmission duration is obtained by the second OLT from the first OLT in advance. For the sending time, the second OLT requests the first OLT to provide the sending time.

For the first indication information in the fourth case, the first indication information does not include the start time and the time length of the measurement window. In the fourth case, the second OLT obtains the time length of the measurement window, and obtains signal transmission duration. The signal transmission duration is the signal transmission duration between the first port on the first OLT and the first ONU. The second OLT obtains the sending time at which the first OLT sends the first indication information, and obtains, based on the signal transmission duration and the sending time, the receiving time at which the first ONU receives the first indication information. The second OLT calculates the start time of the measurement window based on the receiving time and the specified time difference, and determines the measurement window based on the start time and the time length of the measurement window.

In some embodiments, the second OLT includes the time length of the measurement window and the signal transmission duration that is obtained from the first OLT in advance. For the sending time, the second OLT requests the first OLT to provide the sending time.

In some embodiments, the first indication information includes the signal transmission duration and the sending time, and the signal transmission duration and the sending time are obtained from the first indication information.

It should be noted that the measurement window may be the first-type measurement window or the second-type measurement window. When the measurement window is the first-type measurement window, the first OLT receives, on the third PON channel through the first port, the measurement signal sent by the first ONU, and the first OLT does not process the measurement signal received by the first port.

When the measurement window is the second-type measurement window, the measurement window includes at least one sending periodicity, and each sending periodicity includes a send window corresponding to each ONU in the PON and a first time period. Therefore, in a send window corresponding to any ONU, the first OLT may receive, on the third PON channel through the first port, an operation and maintenance service sent by the ONU, and process the operation and maintenance service. However, the first OLT receives, on the third PON channel through the first port in the first time period, the measurement signal sent by the first ONU, and the first OLT does not process a measurement signal received by the first port in the first time period.

4032: The second OLT receives a signal on the first PON channel through the second port in the measurement window.

4033: The second OLT measures the signal received by the second port on the first PON channel, to obtain the quality of the signal corresponding to the first ONU.

For a detailed implementation process in which the second OLT obtains the quality of the signal corresponding to the first ONU, refer to related content in 3032 of the method 300 shown in FIG. 3. Details are not described herein again.

For each ONU other than the first ONU in the PON, the foregoing process of steps 401 to 403 is repeated. The second OLT obtains quality of a signal corresponding to each other ONU, to obtain quality of a signal corresponding to each ONU in the PON, and then the following operation of step 404 is performed.

Step 404: The second OLT sends measurement information to the first OLT, where the measurement information includes the quality of the signal corresponding to each ONU in the PON.

Step 405: The first OLT receives the measurement information, and determines a status of the second backbone link based on the quality of the signal that is corresponding to each ONU and that is included in the measurement information, where the second backbone link is a common part of a link from the second port to each ONU.

The second backbone link is a backbone link between the second port on the second OLT and the ODN.

In step 405, the second OLT determines whether the quality of the signal corresponding to each ONU in the PON exceeds a specified quality threshold. If the quality of the signal corresponding to each ONU in the PON exceeds the specified quality threshold, it is determined that the status of the second backbone link is a normal state. If not all of the quality of the signal corresponding to each ONU in the PON exceeds the specified quality threshold, it is determined that the status of the second backbone link is a faulty state.

When the first OLT is the active OLT, and the first port on the first OLT is the active port, the second OLT is the standby OLT, and the second port on the second OLT is the standby port. After it is determined that the status of the second backbone link is the normal state, the process of 401 to 405 may be repeatedly performed to continue to determine the status of the second backbone link. After it is determined that the status of the second backbone link is the faulty state, a skilled person may be notified for repairing. When the first backbone link is faulty, a service between the first port on the first OLT and each ONU in the PON is switched to the second port on the second OLT.

When the first OLT is the standby OLT, and the first port on the first OLT is the standby port, the second OLT is the active OLT, and the second port on the second OLT is the active port. After it is determined that the status of the second backbone link is the normal state, the service between the first OLT and each ONU in the PON may be switched to the second port on the second OLT, and then the process of 401 to 405 is repeatedly performed to determine a status of a first backbone link connected to the first port on the first OLT. Alternatively, after it is determined that the status of the second backbone link is the faulty state, a skilled person may be notified for repairing.

In this embodiment of this application, the first OLT sends the first indication information to the second OLT and the first ONU through the first port, and the first indication information indicates the measurement window for measuring the first ONU. Therefore, the first ONU determines the measurement window based on the first indication information and sends a signal to the second OLT on the first PON channel in the measurement window. The second OLT determines the measurement window based on the first indication information, receives the signal on the first PON channel through the second port in the measurement window, and measures the signal to obtain the quality of the signal corresponding to the first ONU. By repeating the foregoing process, the quality of the signal corresponding to each ONU can be obtained. In this way, the second OLT determines the status of the backbone link based on the quality of the signal corresponding to each ONU. A service is switched to the backbone link only when the status of the backbone link is the normal state, so that the service can be normally transmitted on the backbone link. Therefore, the link status detection method ensures that the service can be run normally after link switching. Because the quality of the signal corresponding to each ONU is obtained, it is determined that the status of the backbone link is the normal state only when the quality of the signal corresponding to each ONU exceeds the specified quality threshold, to improve precision of determining the status of the backbone link. In addition, a measurement window is specified for each ONU, and the quality of the signal corresponding to each ONU is measured in each measurement window, so that a time length of each measurement window may be configured to be short, only several seconds or tens of seconds, and time needed for measuring the quality of the signal corresponding to each ONU is short. Therefore, the quality of the signal corresponding to each ONU can be obtained in short time, to improve efficiency of measuring the backbone link. In addition, the quality of the signal corresponding to each ONU includes at least one RSSI, and the RSSI can be easily measured. Therefore, based on the at least one RSSI corresponding to each ONU, precision of measuring the status of the backbone link is further improved.

Figure 5:
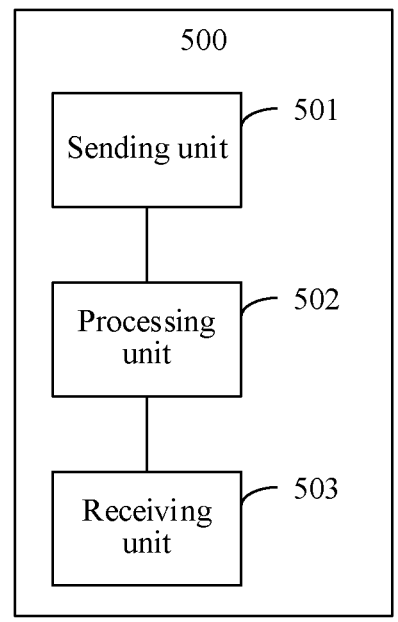
FIG. 5 is a schematic diagram of a structure of a link status measurement apparatus according to an embodiment of this application.

Refer to FIG. 5. An embodiment of this application provides a link status measurement apparatus 500. The apparatus 500 is deployed on the OLT in the PON architecture 100 shown in FIG. 1, the first OLT in the PON architecture 200 shown in FIG. 2, the OLT provided in the method 300 shown in FIG. 3, or the first OLT provided in the method 400 shown in FIG. 4. The apparatus includes:

a sending unit 501, configured to send first indication information to a first optical network unit ONU through a first port, where the apparatus 500 is a device in a passive optical network PON, the first ONU is one of at least one ONU included in the PON, and the first indication information indicates a measurement window for measuring the first ONU; and a processing unit 502, configured to obtain quality of a signal corresponding to the first ONU, where the quality of the signal is quality of a signal received by a second port from a first PON channel in the measurement window, the signal received by the second port includes a measurement signal sent by the first ONU in the measurement window, the first PON channel is used to transmit the measurement signal, a second PON channel is used to transmit a service signal, an optical wavelength corresponding to the measurement signal is different from an optical wavelength corresponding to the service signal, and the first PON channel and the second PON channel are channels carried on a link between the second port and the first ONU.

The processing unit 502 is further configured to determine a status of a backbone link based on quality of a signal corresponding to each ONU in the PON. The backbone link is a common part of a link from the second port to each ONU.

Optionally, for a detailed implementation process in which the sending unit 501 sends the first indication information, refer to related content in step 301 of the method 300 shown in FIG. 3 and step 401 of the method 400 shown in FIG. 4. Details are not described herein again.

Optionally, for a detailed implementation process in which the processing unit 502 obtains the quality of the signal corresponding to the first ONU, refer to related content in step 303 of the method 300 shown in FIG. 3 and steps 403 to 405 of the method 400 shown in FIG. 4. Details are not described herein again.

Optionally, for a detailed implementation process in which the processing unit 502 determines the status of the backbone link, refer to related content in step 304 of the method 300 shown in FIG. 3 and step 405 of the method 400 shown in FIG. 4. Details are not described herein again.

Optionally, the first indication information includes at least one of start time of the measurement window and a time length of the measurement window.

Optionally, the first port is a port on the apparatus 500, the second port is a port on a second OLT, and the apparatus 500 and the second OLT are two different OLT devices. The sending unit 501 is further configured to send the first indication information to the second OLT. The first indication information further indicates the second OLT to obtain the quality of the signal received by the second port from the first PON channel in the measurement window.

Optionally, the apparatus 500 further includes a receiving unit 503.

The receiving unit 503 is configured to receive measurement information sent by the second OLT. The measurement information includes the quality of the signal corresponding to the first ONU.

Optionally, for a detailed implementation process in which the receiving unit 503 receives the measurement information, refer to related content in step 303 of the method 300 shown in FIG. 3 and step 405 of the method 400 shown in FIG. 4. Details are not described herein again.

Optionally, the first port and the second port are two different ports on the apparatus 500.

Optionally, the measurement window includes at least one sending periodicity, and each sending periodicity includes a first time period and a send window corresponding to each ONU. A send window corresponding to the first ONU is a window for the first ONU to send an operation and maintenance service to the apparatus 500, and the first indication information indicates the first ONU to send the measurement signal in the first time period.

Optionally, the quality of the signal corresponding to the first ONU includes at least one received signal strength indication RSSI, and the at least one RSSI is an RSSI of the signal received by the second port in the measurement window.

In this embodiment of this application, the sending unit sends the first indication information to the first ONU through the first port. The first indication information indicates the measurement window for measuring the first ONU. The processing unit obtains the quality of the signal corresponding to the first ONU, and determines the status of the backbone link based on the quality of the signal corresponding to each ONU in the PON. Because the sending unit sends the first indication information to the first ONU through the first port, and the first indication information indicates the measurement window for measuring the first ONU, the first ONU sends a signal on the first PON channel in the measurement window. In this way, the second OLT measures quality of the signal received by the second port in the measurement window, to obtain the quality of the signal corresponding to the first ONU. The quality of the signal corresponding to each ONU in the PON can be obtained by repeating the foregoing process. In this way, the processing unit can accurately determine the status of the backbone link based on the quality of the signal corresponding to each ONU, so that precision of measuring the status of the backbone link is improved. In addition, a measurement window is provided for the first ONU, and the quality of the signal corresponding to the first ONU is measured in the measurement window. In this way, the processing unit may measure the quality of the signal corresponding to the first ONU in a short time, and the time length of the measurement window may be set to be short. Therefore, although a measurement window is separately provided for each ONU to separately obtain the quality of the signal corresponding to each ONU in a measurement window corresponding to each ONU, a total time length of the measurement window corresponding to each ONU is also short. This improves efficiency of measuring the status of the backbone link.

Figure 6:
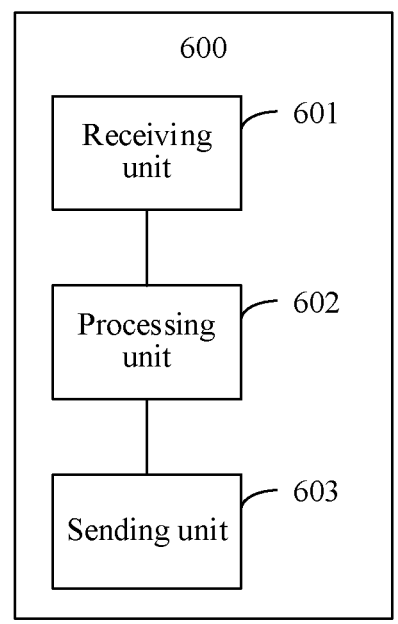
FIG. 6 is a schematic diagram of a structure of another link status measurement apparatus according to an embodiment of this application.

Refer to FIG. 6. An embodiment of this application provides a link status measurement apparatus 600. The apparatus 600 is deployed on the second OLT in the PON architecture shown in FIG. 2, or the second OLT provided in the method 400 shown in FIG. 4. The apparatus includes:

a receiving unit 601, configured to receive first indication information, where the first indication information is information sent by a first OLT to the apparatus 600 and a first optical network unit ONU, the first OLT and the apparatus 600 are two devices in a passive optical network PON, the first ONU is one of at least one ONU included in the PON, and the first indication information indicates a measurement window for measuring the first ONU;

a processing unit 602, configured to measure a signal received by a second port from a first PON channel in the measurement window, to obtain quality of a signal corresponding to the first ONU, where the signal received by the second port includes a measurement signal sent by the first ONU in the measurement window, the second port is a port on the apparatus 600, the first PON channel is used to transmit the measurement signal, a second PON channel is used to transmit a service signal, an optical wavelength corresponding to the measurement signal is different from an optical wavelength corresponding to the service signal, and the first PON channel and the second PON channel are channels carried on a link between the second port and the first ONU; and a sending unit 603, configured to send measurement information to the first OLT, where the measurement information includes quality of a signal corresponding to each ONU in the PON, the measurement information is used to trigger the first OLT to determine quality of a backbone link based on the quality of the signal corresponding to each ONU, and the backbone link is a common part of a link from the second port to each ONU.

Optionally, for a detailed implementation process in which the receiving unit 601 receives the first indication information, refer to related content in step 403 of the method 400 shown in FIG. 4. Details are not described herein again.

Optionally, for a detailed implementation process in which the processing unit 602 measures the signal received by the second port, refer to related content in step 403 of the method 400 shown in FIG. 4. Details are not described herein again.

Optionally, for a detailed implementation process in which the sending unit 603 sends the measurement information, refer to related content in step 404 of the method 400 shown in FIG. 4. Details are not described herein again.

Optionally, the first indication information includes at least one of start time of the measurement window and a time length of the measurement window.

Optionally, the measurement window includes at least one communication periodicity, and each communication periodicity includes a first time period and a send window corresponding to each ONU. A send window corresponding to the first ONU is a window for the first ONU to send an operation and maintenance service to the first OLT, and the first indication information indicates the first ONU to send the measurement signal in the first time period.

Optionally, the quality of the signal corresponding to the first ONU includes at least one received signal strength indication RSSI, and the at least one RSSI is an RSSI of the signal received by the second port in the measurement window.

In this embodiment of this application, a receiving unit receives the first indication information, and a processing unit measures the signal received by the second port from the first PON channel in the measurement window, to obtain the quality of the signal corresponding to the first ONU. The signal received by the second port includes a signal sent by the first ONU in the measurement window, and the second PON channel is used to transmit a data service. A sending unit sends the measurement information to the first OLT. The measurement information includes the quality of the signal corresponding to each ONU in the PON. This enables the first OLT to determine the quality of the backbone link based on the quality of the signal corresponding to each ONU. The backbone link is the common part of the link from the second port to each ONU. Because the first indication information indicates the measurement window for measuring the first ONU, the first ONU sends a signal on the first PON channel in the measurement window. In this way, the processing unit measures quality of the signal received by the second port in the measurement window, to obtain the quality of the signal corresponding to the first ONU. By repeating the foregoing process, the quality of the signal corresponding to each ONU in the PON can be obtained, and the sending unit sends the quality of the signal corresponding to each ONU to the first OLT. In this way, the first OLT can accurately determine a status of a backbone link based on the quality of the signal corresponding to each ONU. A service is switched to the backbone link only when the status of the backbone link is a normal state, so that the service can be normally transmitted on the backbone link. Therefore, the link status detection method ensures that the service can be run normally after link switching. Because the quality of the signal corresponding to each ONU is obtained, precision of measuring the status of the backbone link is improved. In addition, a measurement window is provided for the first ONU, and the quality of the signal corresponding to the first ONU is measured in the measurement window. In this way, the processing unit may measure the quality of the signal corresponding to the first ONU in a short time, and the time length of the measurement window may be set to be short. Therefore, although a measurement window is separately provided for each ONU to separately obtain the quality of the signal corresponding to each ONU in a measurement window corresponding to each ONU, a total time length of the measurement window corresponding to each ONU is also short. This improves efficiency of measuring the status of the backbone link.

Figure 7:
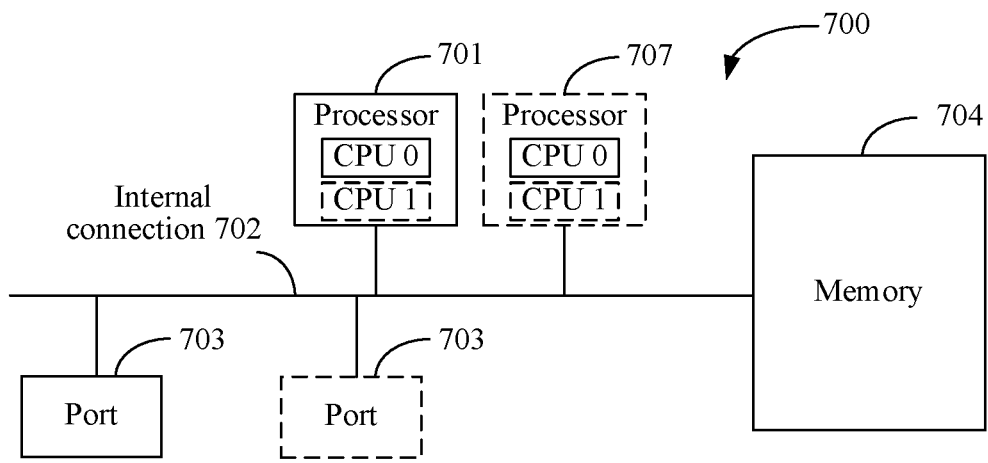
FIG. 7 is a schematic diagram of a structure of another link status measurement apparatus according to an embodiment of this application.

Refer to FIG. 7. An embodiment of this application provides a schematic diagram of a link status measurement apparatus 700. The apparatus 700 may be the OLT in the PON architecture 100 shown in FIG. 1, the first OLT in the PON architecture 200 shown in FIG. 2, the OLT in the method 300 shown in FIG. 3, or the first OLT in the method 400 shown in FIG. 4. The apparatus 700 includes at least one processor 701, an internal connection 702, and at least one port 703.

The apparatus 700 is an apparatus of a hardware structure, and may be configured to implement functional modules in the apparatus 500 shown in FIG. 5. For example, a person skilled in the art may figure out that the processing unit 502 in the apparatus 500 shown in FIG. 5 may be implemented by the at least one processor 701, and the sending unit 501 and the receiving unit 503 in the apparatus 500 shown in FIG. 5 may be implemented by the at least one port 703.

Optionally, the apparatus 700 may be further configured to implement a function of the OLT in any one of the foregoing embodiments.

Optionally, the apparatus 700 may be the OLT in the PON architecture 100 shown in FIG. 1 or the OLT in the method 300 shown in FIG. 3. The at least one port 703 includes a first port and a second port on the OLT.

Optionally, the apparatus 700 may be the first OLT in the PON architecture 200 shown in FIG. 2 or the first OLT in the method 400 shown in FIG. 4. The at least one port 703 includes a first port on the first OLT.

Optionally, the processor 701 may be a hardware circuit, a general-purpose central processing unit (CPU), a network processor (NP), a microprocessor, an application-specific integrated circuit (ASIC), or one or more integrated circuits configured to control program execution of solutions of this application.

Optionally, refer to FIG. 7. When the processor 701 is a CPU, a microprocessor, or the like, the apparatus 700 further includes a memory 704, and the processing unit 502 in the apparatus 500 shown in FIG. 5 may be implemented by the at least one processor 701 by invoking code in the memory 704.

The internal connection 702 may include a path for transmitting information between the foregoing components. Optionally, the internal connection 702 is a board, a bus, or the like.

The at least one port 703 is configured to communicate with another device or a communication network.

The memory 704 may be a read-only memory (ROM) or another type of static storage device that can store static information and instructions, random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and is connected to the processor through the bus. Alternatively, the memory may be integrated with the processor.

The memory 704 is configured to store application program code for executing the solutions of this application, and the processor 701 controls execution. The processor 701 is configured to execute the application program code stored in the memory 704, and cooperate with the at least one port 703, so that the apparatus 700 implements functions in the method in this patent.

During specific implementation, in an embodiment, the processor 701 may include one or more CPUs, for example, a CPU 0 and a CPU 1 shown in FIG. 7.

During specific implementation, in an embodiment, the apparatus 700 may include a plurality of processors, for example, the processor 701 and a processor 707 shown in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

Figure 8:
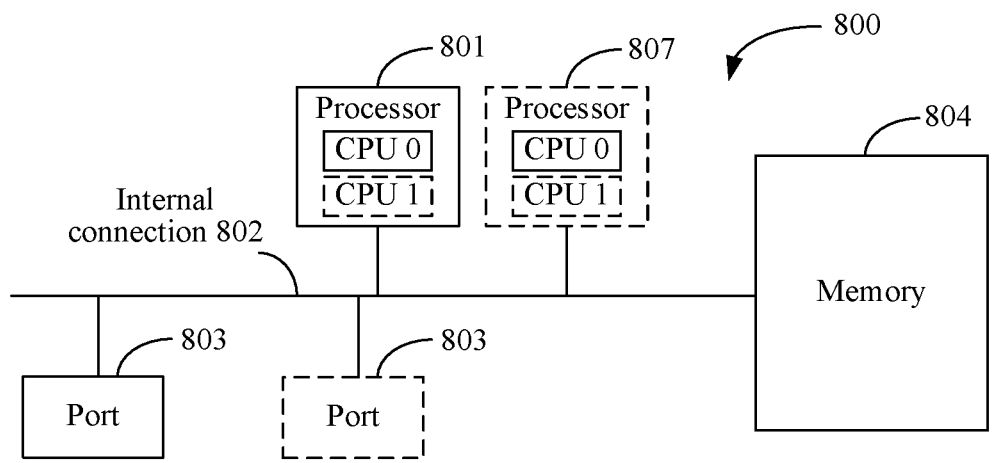
FIG. 8 is a schematic diagram of a structure of another link status measurement apparatus according to an embodiment of this application.

Refer to FIG. 8. An embodiment of this application provides a schematic diagram of a link status measurement apparatus 800. The apparatus 800 may be the second OLT in the PON architecture 200 shown in FIG. 2, or the second OLT in the method 400 shown in FIG. 4. The apparatus 800 includes at least one processor 801, an internal connection 802, and at least one port 803.

The apparatus 800 is an apparatus of a hardware structure, and may be configured to implement functional modules in the apparatus 600 shown in FIG. 6. For example, a person skilled in the art may figure out that the processing unit 602 in the apparatus 600 shown in FIG. 6 may be implemented by the at least one processor 801, and the sending unit 603 and the receiving unit 601 in the apparatus 600 shown in FIG. 6 may be implemented by the at least one port 803.

Optionally, the apparatus 800 may be further configured to implement a function of the second OLT in any one of the foregoing embodiments.

Optionally, the apparatus 800 may be the second OLT in the PON architecture 200 shown in FIG. 2 or the second OLT in the method 400 shown in FIG. 4. The at least one port 803 includes a second port on the second OLT.

Optionally, the processor 801 may be a hardware circuit, a general-purpose central processing unit (CPU), a network processor (NP), a microprocessor, an application-specific integrated circuit (ASIC), or one or more integrated circuits configured to control program execution of solutions of this application.

Optionally, refer to FIG. 8. When the processor 801 is a CPU, a microprocessor, or the like, the apparatus 800 further includes a memory 804, and the processing unit 602 in the apparatus 600 shown in FIG. 6 may be implemented by the at least one processor 801 by invoking code in the memory 804.

The internal connection 802 may include a path for transmitting information between the foregoing components. Optionally, the internal connection 802 is a board, a bus, or the like.

The at least one port 803 is configured to communicate with another device or a communication network.

The memory 804 may be a read-only memory (ROM) or another type of static storage device that can store static information and instructions, random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and is connected to the processor through the bus. Alternatively, the memory may be integrated with the processor.

The memory 804 is configured to store application program code for executing the solutions of this application, and the processor 801 controls execution. The processor 801 is configured to execute the application program code stored in the memory 804, and cooperate with the at least one port 803, so that the apparatus 800 implements functions in the method in this patent.

During specific implementation, in an embodiment, the processor 801 may include one or more CPUs, for example, a CPU 0 and a CPU 1 shown in FIG. 8.

During specific implementation, in an embodiment, the apparatus 800 may include a plurality of processors, for example, the processor 801 and a processor 807 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

Figure 9:
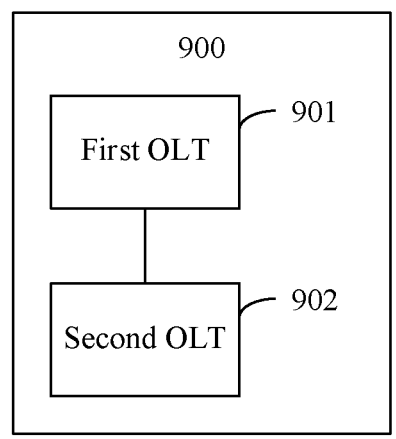
FIG. 9 is a schematic diagram of a structure of a link status measurement system according to an embodiment of this application.

Refer to FIG. 9. An embodiment of this application provides a link status measurement system 900. The system 900 includes the apparatus 500 shown in FIG. 5 and the apparatus 600 shown in FIG. 6, or the system 900 includes the apparatus 700 shown in FIG. 7 and the apparatus 800 shown in FIG. 8.

The apparatus 500 shown in FIG. 5 or the apparatus 800 shown in FIG. 8 may be a first OLT 901, and the apparatus 600 shown in FIG. 6 or the apparatus 800 shown in FIG. 8 may be a second OLT 902.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this application, but are not intended to limit this application. Any modification, equivalent replacement, or improvement made within the principle of this application should fall within the protection scope of this application.

What is claimed is:

1. A method, wherein the method comprises:
sending, by a first optical line terminal (OLT), first indication information to a first optical network unit (ONU) through a first port, wherein the first OLT is a device in a passive optical network (PON), the first ONU is one of at least one ONU comprised in the PON, and the first indication information indicates a measurement window for measuring the first ONU;
obtaining, by the first OLT, quality of a signal received by a second port from a first PON channel in the measurement window, the quality of the signal corresponding to the first ONU, wherein the signal received by the second port comprises a measurement signal sent by the first ONU in the measurement window, the first PON channel is used to transmit the measurement signal, a second PON channel is used to transmit a service signal, a first optical wavelength corresponding to the measurement signal is different from a second optical wavelength corresponding to the service signal, and the first PON channel and the second PON channel are channels carried on a link between the second port and the first ONU; and
determining, by the first OLT, a status of a backbone link based on respective quality of a respective signal corresponding to each ONU in the PON, wherein the backbone link is a common part of a respective link from the second port to each ONU.

2. The method according to claim 1, wherein the first indication information indicates at least one of start time of the measurement window or a time length of the measurement window.

3. The method according to claim 1, wherein the first port is on the first OLT, the second port is on a second OLT, the first OLT and the second OLT are different OLT devices, and the method further comprises:
sending, by the first OLT, the first indication information to the second OLT, wherein the first indication information further indicates to the second OLT to obtain the quality of the signal received by the second port from the first PON channel in the measurement window.

4. The method according to claim 3, wherein the obtaining, by the first OLT, the quality of the signal corresponding to the first ONU comprises:
receiving, by the first OLT, measurement information sent by the second OLT, wherein the measurement information indicates the quality of the signal corresponding to the first ONU.

5. The method according to claim 1, wherein the first port and the second port are two different ports on the first OLT.

6. The method according to claim 1, wherein the measurement window comprises at least one sending periodicity, each sending periodicity of the at least one sending periodicity comprises a respective first time period and a respective send window corresponding to each ONU, a send window corresponding to the first ONU is for the first ONU to send an operation and maintenance service to the first OLT, and the first indication information indicates to the first ONU to send the measurement signal in the respective first time period.

7. The method according to claim 1, wherein the quality of the signal corresponding to the first ONU comprises at least one received signal strength indication (RSSI), and the at least one RSSI is of the signal received by the second port in the measurement window.

8. A method, wherein the method comprises:
receiving, by a second optical line terminal (OLT), first indication information, wherein the first indication information is sent by a first OLT to the second OLT and a first optical network unit (ONU), the first OLT and the second OLT are two devices in a passive optical network (PON), the first ONU is one of at least one ONU comprised in the PON, and the first indication information indicates a measurement window for measuring the first ONU;
measuring, by the second OLT, a signal received by a second port from a first PON channel in the measurement window, to obtain quality of the signal corresponding to the first ONU, wherein the signal received by the second port comprises a measurement signal sent by the first ONU in the measurement window, the second port is on the second OLT, the first PON channel is used to transmit the measurement signal, a second PON channel is used to transmit a service signal, a first optical wavelength corresponding to the measurement signal is different from a second optical wavelength corresponding to the service signal, and the first PON channel and the second PON channel are channels carried on a link between the second port and the first ONU; and
sending, by the second OLT, measurement information to the first OLT, wherein the measurement information indicates respective quality of a respective signal corresponding to each ONU in the PON, the measurement information is used to trigger the first OLT to determine quality of a backbone link based on the respective quality of the respective signal corresponding to each ONU, and the backbone link is a common part of a respective link from the second port to each ONU.

9. The method according to claim 8, wherein the first indication information indicates at least one of start time of the measurement window or a time length of the measurement window.

10. The method according to claim 8, wherein the measurement window comprises at least one communication periodicity, each communication periodicity comprises a respective first time period and a respective send window corresponding to each ONU, a send window corresponding to the first ONU is for the first ONU to send an operation and maintenance service to the first OLT, and the first indication information indicates to the first ONU to send the measurement signal in the respective first time period.

11. The method according to claim 8, wherein the quality of the signal corresponding to the first ONU comprises at least one received signal strength indication (RSSI), and the at least one RSSI is of the signal received by the second port in the measurement window.

12. An apparatus, wherein the apparatus comprises:
at least one processor; and
a non-transitory computer readable storage medium storing programming, the programming including instructions that, when executed by the at least one processor, cause the apparatus to perform operations including:
sending first indication information to a first optical network unit (ONU) through a first port, wherein the apparatus is a device in a passive optical network (PON), the first ONU is one of at least one ONU comprised in the PON, and the first indication information indicates a measurement window for measuring the first ONU;
obtaining quality of a signal received by a second port from a first PON channel in the measurement window, the quality of the signal corresponding to the first ONU, wherein the signal received by the second port comprises a measurement signal sent by the first ONU in the measurement window, the first PON channel is used to transmit the measurement signal, a second PON channel is used to transmit a service signal, a first optical wavelength corresponding to the measurement signal is different from a second optical wavelength corresponding to the service signal, and the first PON channel and the second PON channel are channels carried on a link between the second port and the first ONU; and
determining a status of a backbone link based on respective quality of a respective signal corresponding to each ONU in the PON, wherein the backbone link is a common part of a respective link from the second port to each ONU.

13. The apparatus according to claim 12, wherein the first indication information indicates at least one of start time of the measurement window or a time length of the measurement window.

14. The apparatus according to claim 12, wherein the first port is on the apparatus, the second port is on a second OLT, the apparatus and the second OLT are different OLT devices, and the operations further comprise:
sending the first indication information to the second OLT, wherein the first indication information further indicates to the second OLT to obtain the quality of the signal received by the second port from the first PON channel in the measurement window.

15. The apparatus according to claim 14, wherein the obtaining the quality of the signal corresponding to the first ONU comprises:
receiving measurement information sent by the second OLT, wherein the measurement information indicates the quality of the signal corresponding to the first ONU.

16. The apparatus according to claim 12, wherein the first port and the second port are two different ports on the apparatus.

17. The apparatus according to claim 12, wherein the measurement window comprises at least one sending periodicity, each sending periodicity of the at least one sending periodicity comprises a respective first time period and a respective send window corresponding to each ONU, a send window corresponding to the first ONU is for the first ONU to send an operation and maintenance service to the apparatus, and the first indication information indicates to the first ONU to send the measurement signal in the respective first time period.

18. The apparatus according to claim 12, wherein the quality of the signal corresponding to the first ONU comprises at least one received signal strength indication (RSSI), and the at least one RSSI is of the signal received by the second port in the measurement window.

\* \* \* \* \*